United States Patent
Wang et al.

(10) Patent No.: US 6,564,116 B2
(45) Date of Patent: May 13, 2003

(54) METHOD FOR DETERMINING EFFICIENTLY PARAMETERS IN CHEMICAL-MECHANICAL POLISHING (CMP)

(76) Inventors: Gou-Jen Wang, 23F-2, No. 916, Chung-Ming S. Rd., Taichung (TW); Jhy-Cherng Tsai, 3F, No. 262, Sec. 1, Nan-Kou Rd., Changhua (TW); Jau-Liang Chen, No. 50, Lin-Sen Rd., Taichung (TW)

( * ) Notice: Subject to any disclaimer, the term of this patent is extended or adjusted under 35 U.S.C. 154(b) by 104 days.

(21) Appl. No.: 09/826,929

(22) Filed: Apr. 6, 2001

(65) Prior Publication Data

US 2003/0028279 A1 Feb. 6, 2003

(51) Int. Cl.⁷ .............................. G06F 19/00
(52) U.S. Cl. .................. 700/121; 438/692; 156/345.12
(58) Field of Search .................. 438/692; 700/121; 156/345.12

(56) References Cited

U.S. PATENT DOCUMENTS 6,291,349 B1 * 9/2001 Molnar ................ 216/38
6,413,153 B1 * 7/2002 Molar ................. 451/259
6,440,857 B1 * 8/2002 Li et al. .............. 438/692

* cited by examiner

*Primary Examiner*—Leo Picard
*Assistant Examiner*—Alexander Kosowski
(74) *Attorney, Agent, or Firm*—Foley & Lardner

(57) ABSTRACT

A method of determining efficiently parameters in chemical-mechanical polishing, especially a method includes a Neural-Taguchi method to seek the best parameter set to increase the quantity of output. This invention involves a time parameter to achieve end-point detection on line during the CMP procedure and also completes a maximum material removal rate (MRR) and a minimum within wafer non-uniformity (WIWNU) at the same time.

6 Claims, 3 Drawing Sheets

METHOD FOR DETERMINING EFFICIENTLY PARAMETERS IN CHEMICAL-MECHANICAL POLISHING (CMP)

BACKGROUND OF THE INVENTION

1. Field of the Invention

The present invention relates a method of determining efficient parameters in chemical-mechanical polishing, wherein the method is based on imitating a virtual CMP process in neural network progress and then determining a parameter set inputted into an electronic polishing machine to make wafer polishing efficient.

2. Description of Related Art

A chemical-mechanical polishing (CMP) is a process used to manufacture semiconductor wafers. Typically, the chemical-mechanical polishing involves rotating a thin, flat semiconductor wafer against a polishing pad, rotating the polishing pad against the wafer, or both. A chemical slurry containing a polishing agent such as alumina or silica, acts as an abrasive medium between the wafer and the pad and makes the wafer have an excellent planar surface after polishing. The CMP procedure includes a chemical reaction and a mechanical movement, therefore several coefficients such as the down force of the wafer, platen speed, solid content of the chemical slurry, and pH of the chemical slurry etc. significantly influence the efficiency of the polishing.

The conventional CMP does not provide a suitable method for detecting a planar end-point. For example, one conventional method requires a technician to remove a semiconductor wafer from the chemical mechanical polishing process, inspect the wafer for the desired end-point, and then return the wafer to the process if the desired end-point is not observed. This is obviously time-consuming and inefficient. How to control the polishing at an end-point precisely is a major problem in all kinds of wafer polishing.

Several types of end-point detection having no need to remove the semiconductor from the production line have been invented:

1. Motor current method;
2. Pad thermal image;
3. Optic interferometer method;
4. Acoustic method; and
5. Small vibration method.

Although the above-mentioned detecting methods are based on different theories, those methods all need a precise close-loop to assist in controlling the wafer polishing. However, mature controlling techniques of close-loop are not common, so there is a requirement of an excellent controlling technique that can perfectly combine the CMP procedure and the end-point detection on line to increase the quantity of output.

To overcome the existing problem in chemical-mechanical polishing, the present invention tends to provide a method of determining efficient parameters in chemical-mechanical polishing, which achieve high efficiency in the CMP procedure.

Other objects, advantages and novel features of the invention will become more apparent from the following detailed description when taken in conjunction with the accompanying tables and figures.

SUMMARY OF THE INVENTION

The main objective of the invention is to provide a method of determining efficiently parameters in chemical-mechanical polishing, especially the parameters of this method involve a time parameter and the parameters are set at the best value.

Another objective of the invention is to provide a method of determining efficiently parameters in chemical-mechanical polishing, whereby the CMP procedure and the end-point detection are efficiently combined on line to increase the quantity of output and diminish the polishing time.

Still another objective of the invention is to provide a method of determining efficiently parameters in chemical-mechanical polishing, wherein the maximum material removal rate (MRR) and the minimum within wafer non-uniformity (WIWNU) are achieved in the CMP procedure.

DETAILED DESCRIPTION OF PREFERRED EMBODIMENT

Figure 1:
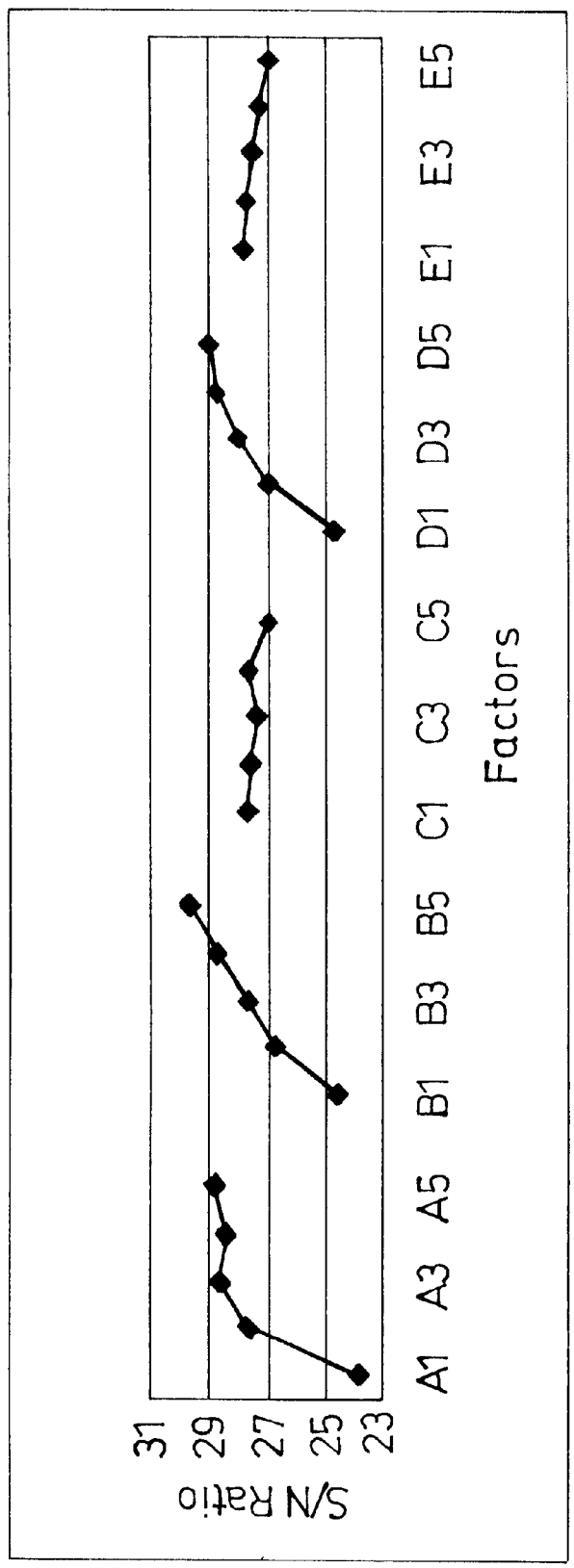
FIG. 1 is a response figure of material removal rate (MRR)

In this invention, an analyzing system named Neural-Taguchi experimental method is employed in a computer to determine a set of efficient parameters in a CMP process. The Neural-Taguchi method combines the neural networks with the Taguchi experimental method, a computer analysis system with a parameter setting system, and is used in modifying the essential parameters in the CMP procedure. Steps to determine the parameters of this invention are illustrated in accompaniment with experimental data in tables and figures.

1. Using the Taguchi Experiment to Design and Conduct the CMP Procedure:

An oxide layer on the wafer is a removed target in this experiment because it is obtained easily. Four essential parameters are picked out as changeable parameters and adjusted during the experiment. The four parameters are:

A. Solid content;
B. Down force;
C. Back pressure;
D. Platen speed;

The Preston equation shows a relationship of removal rate with polishing pressure and polishing speed, and the Preston equation is shown as following:

$$\text{Removal rate} = \frac{\Delta H}{\Delta t} = kp \times P \times \frac{\Delta s}{\Delta t}$$

where $\Delta H$: variation of surface thickness;

$\Delta t$: polishing time;

$K_p$: coefficient of polishing;

P: polishing pressure;

$\Delta S/\Delta t$: linear speed of the wafer comparative to polishing pad.

According to the Preston equation, the removal rate relates to the polishing pressure and polishing speed in a direct proportion. Furthermore, the polishing pressure is calculated from dividing the down pressure by the contact area of the polishing pad. When the polishing time changes, a uniformity of a wafer surface is different, and the contact area and the down pressure respectively change, too. Therefore, a material removal rate and a within wafer non-uniformity (WIWNU) are functions of the polishing time and the polishing time is picked out to be a fifth (E) elementary parameter of a CMP process. Therefor, all essential parameters are:

A. Solid content;
B. Down force;
C. Back pressure;
D. Platen speed; and
E. Polishing time.

In the design of experiment, an $L_{25}(5\times5)$ orthogonal array as shown in Table 1 is adapted This orthogonal array has 25 columns, 5 rows, where 5 rows present 5 control variable from A to E. Five levels on each variable covering the domain of interest are set. The dependent variables to be observed are MRR and WIWNU, where the MRR is the bigger the better and the WIWNU is the smaller the better. The MRR and the WIWNU are calculated by the following methods and equations:

(a). Measure a thickness ($t_1$) of the wafer at nine points by an AFT.

(b). Measure a thickness ($t_2$) of the wafer after polishing in (T) minutes;

(c). Polishing speed=$(t_1-t_2)/T$, an average of polishing speeds in each point is the material removal rate (MRR).

(d). Within wafer non-uniformity (WIWNU)=($\sigma$: standard deviation of $t_2$)/(mean of $t_2$)×100%

Since it only makes sense to compare WIWNUs after wafer have been polished and have similar thickness, we replace WIWNU with standard deviation of $t_2$ in this invention.

2. Signal/Noise Ratio Analysis:

Control factors and noise factors greatly influence the efficiency in the CMP procedure and the signal(S)/noise(N) ratio is an index to indicate the quality of output. If the S/N ratio is high, the efficiency of the procedure and the quality of output wafer are good.

As shown in table 2, the S/N ratio of the MRR and the standard deviation of $t_2$ (STDEV ($t_2$)) are calculated respectively based on the $L_{25}(5^5)$ orthogonal array, and then are used to make response tables (Tabs. 3 and 4) and response figures (FIGS. 1 and 2) with the five parameters. Lastly, analysis of variance (ANOVA) is used in estimating contributing degrees of each parameter.

TABLE 1

$L_{25}$ (5 × 5) orthogonal array in each trial in a CMP procedure.

| | | $L_{25}(5^5)$ | | | | Col. A Solid Content (wt %) | B Down Force (psi) | C Back Pressure (psi) | D Platen Speed (rpm) | E Polish. Time (sec) |
|---|---|---|---|---|---|---|---|---|---|---|
| Row | A | B | C | D | E | | | | | |
| 1 | 1 | 1 | 1 | 1 | 1 | 5% | 4 | 0 | 20 | 40 |
| 2 | 1 | 2 | 2 | 2 | 2 | 5% | 5 | 1 | 30 | 45 |
| 3 | 1 | 3 | 3 | 3 | 3 | 5% | 6 | 2 | 40 | 50 |
| 4 | 1 | 4 | 4 | 4 | 4 | 5% | 7 | 3 | 50 | 55 |
| 5 | 1 | 5 | 5 | 5 | 5 | 5% | 8 | 3.5 | 60 | 60 |
| 6 | 2 | 1 | 4 | 2 | 3 | 10% | 4 | 3 | 30 | 50 |
| 7 | 2 | 2 | 5 | 3 | 4 | 10% | 5 | 3.5 | 40 | 55 |
| 8 | 2 | 3 | 1 | 4 | 5 | 10% | 6 | 0 | 50 | 60 |
| 9 | 2 | 4 | 2 | 5 | 1 | 10% | 7 | 1 | 60 | 40 |
| 10 | 2 | 5 | 3 | 1 | 2 | 10% | 8 | 2 | 20 | 45 |
| 11 | 3 | 1 | 2 | 3 | 5 | 15% | 4 | 1 | 40 | 60 |
| 12 | 3 | 2 | 3 | 4 | 1 | 15% | 5 | 2 | 50 | 40 |
| 13 | 3 | 3 | 4 | 5 | 2 | 15% | 6 | 3 | 60 | 45 |
| 14 | 3 | 4 | 5 | 1 | 3 | 15% | 7 | 3.5 | 20 | 50 |
| 15 | 3 | 5 | 1 | 2 | 4 | 15% | 8 | 0 | 30 | 55 |
| 16 | 4 | 1 | 5 | 4 | 2 | 20% | 4 | 3.5 | 50 | 45 |
| 17 | 4 | 2 | 1 | 5 | 3 | 20% | 5 | 0 | 60 | 50 |
| 18 | 4 | 3 | 2 | 1 | 4 | 20% | 6 | 1 | 20 | 55 |
| 19 | 4 | 4 | 3 | 2 | 5 | 20% | 7 | 2 | 30 | 60 |
| 20 | 4 | 5 | 4 | 3 | 1 | 20% | 8 | 3 | 40 | 40 |
| 21 | 5 | 1 | 3 | 5 | 4 | 25% | 4 | 2 | 60 | 55 |
| 22 | 5 | 2 | 4 | 1 | 5 | 25% | 5 | 3 | 20 | 60 |
| 23 | 5 | 3 | 5 | 2 | 1 | 25% | 6 | 3.5 | 30 | 40 |
| 24 | 5 | 4 | 1 | 3 | 2 | 25% | 7 | 0 | 40 | 45 |
| 25 | 5 | 5 | 2 | 4 | 3 | 25% | 8 | 1 | 50 | 50 |

TABLE 2 an experimental resuits and S/N ratio table

| | $L_{25}(5^5)$ | | | | | MRR | | | |
|---|---|---|---|---|---|---|---|---|---|
| | A | B | C | D | E | (A/S) | (S/N) | $\sigma_{t2}$ | (S/N) |
| 1 | 1 | 1 | 1 | 1 | 1 | 9.14 | 19.22 | 137.540 | 17.23 |
| 2 | 1 | 2 | 2 | 2 | 2 | 14.5 | 23.23 | 109.591 | 19.20 |
| 3 | 1 | 3 | 3 | 3 | 3 | 16.34 | 24.26 | 99.567 | 20.04 |
| 4 | 1 | 4 | 4 | 4 | 4 | 20.31 | 26.15 | 128.673 | 17.81 |
| 5 | 1 | 5 | 5 | 5 | 5 | 20.55 | 26.26 | 98.534 | 20.13 |
| 6 | 2 | 1 | 4 | 2 | 3 | 16.09 | 24.13 | 51.999 | 25.68 |
| 7 | 2 | 2 | 5 | 3 | 4 | 23.45 | 27.4 | 152.866 | 16.31 |
| 8 | 2 | 3 | 1 | 4 | 5 | 28.92 | 29.22 | 298.643 | 10.50 |
| 9 | 2 | 4 | 2 | 5 | 1 | 34.64 | 30.79 | 88.683 | 21.04 |
| 10 | 2 | 5 | 3 | 1 | 2 | 22.51 | 27.05 | 112.108 | 19.01 |
| 11 | 3 | 1 | 2 | 3 | 5 | 19.44 | 25.77 | 92.238 | 20.70 |
| 12 | 3 | 2 | 3 | 4 | 1 | 27.68 | 28.84 | 114.126 | 18.85 |

TABLE 2-continued an experimental results and S/N ratio table

| | $L_{25}$ (5$^5$) | | | | | MRR | | | |
|---|---|---|---|---|---|---|---|---|---|
| | A | B | C | D | E | (A/S) | (S/N) | $\sigma_{t2}$ | (S/N) |
| 13 | 3 | 3 | 4 | 5 | 2 | 36.89 | 31.34 | 114.363 | 18.83 |
| 14 | 3 | 4 | 5 | 1 | 3 | 22.11 | 26.89 | 55.401 | 25.13 |
| 15 | 3 | 5 | 1 | 2 | 4 | 31.84 | 30.06 | 110.232 | 19.15 |
| 16 | 4 | 1 | 5 | 4 | 2 | 20.44 | 26.21 | 100.058 | 19.99 |
| 17 | 4 | 2 | 1 | 5 | 3 | 29.22 | 29.31 | 169.638 | 15.41 |
| 18 | 4 | 3 | 2 | 1 | 4 | 18.37 | 25.28 | 167.419 | 15.52 |
| 19 | 4 | 4 | 3 | 2 | 5 | 28.72 | 29.16 | 114.870 | 18.80 |
| 20 | 4 | 5 | 4 | 3 | 1 | 39.28 | 31.88 | 69.075 | 23.21 |
| 21 | 5 | 1 | 3 | 5 | 4 | 23.25 | 27.33 | 113.494 | 18.90 |
| 22 | 5 | 2 | 4 | 1 | 5 | 17.1 | 24.66 | 46.615 | 26.63 |
| 23 | 5 | 3 | 5 | 2 | 1 | 25.74 | 28.21 | 52.903 | 25.53 |
| 24 | 5 | 4 | 1 | 3 | 2 | 34.59 | 30.78 | 139.578 | 17.10 |
| 25 | 5 | 5 | 2 | 4 | 3 | 44.11 | 32.89 | 206.076 | 13.72 |

TABLE 3 a response table of material removal rate (MRR)

| | Factor | | | | |
|---|---|---|---|---|---|
| | A | B | C | D | E |
| | Solid | Down | Back | Platen | Polishing |
| | Content | Force | Pressure | Speed | time |
| Level | (wt %) | (psi) | (psi) | (rpm) | (sec) |
| 1 | 23.80363 | 24.53263 | 27.71867 | 24.62076 | 27.78998 |
| 2 | 27.71891 | 26.68942 | 27.59314 | 26.95966 | 27.72017 |
| 3 | 28.58194 | 27.66443 | 27.32932 | 28.02038 | 27.49836 |
| 4 | 28.37092 | 28.75611 | 27.63418 | 28.66399 | 27.24576 |
| 5 | 28.77449 | 29.60729 | 26.97457 | 28.9851 | 26.99562 |

TABLE 4 a response table of the standard deviation of $t_2$.

| | Factor | | | | |
|---|---|---|---|---|---|
| | A | B | C | D | E |
| | Solid | Down | Back | Platen | Polishing |
| | Content | Force | Pressure | Speed | time |
| Level | (wt %) | (psi) | (psi) | (rpm) | (sec) |
| 1 | 18.88245 | 20.50176 | 15.8791 | 20.7043 | 21.17418 |
| 2 | 18.50823 | 19.28189 | 18.03852 | 21.6729 | 18.82889 |
| 3 | 20.53432 | 18.08461 | 19.11871 | 19.4741 | 19.99524 |
| 4 | 18.58753 | 19.97647 | 22.43348 | 16.8772 | 17.54044 |
| 5 | 20.37666 | 19.04445 | 21.41936 | 20.6428 | 19.35043 |

The response tables show the effect of each factor at different levels and the response figures illustrate the trend of effect changes between levels. From the response tables and response plot, we can find the value of each factor that can maximize S/N ratio, i.e. the optimal value. Combining all the factors at the optimal level, we get the optimal parameters set with regard to the MRR and the WIWNU (in terms of $\sigma_{t2}$)

Figure 2:
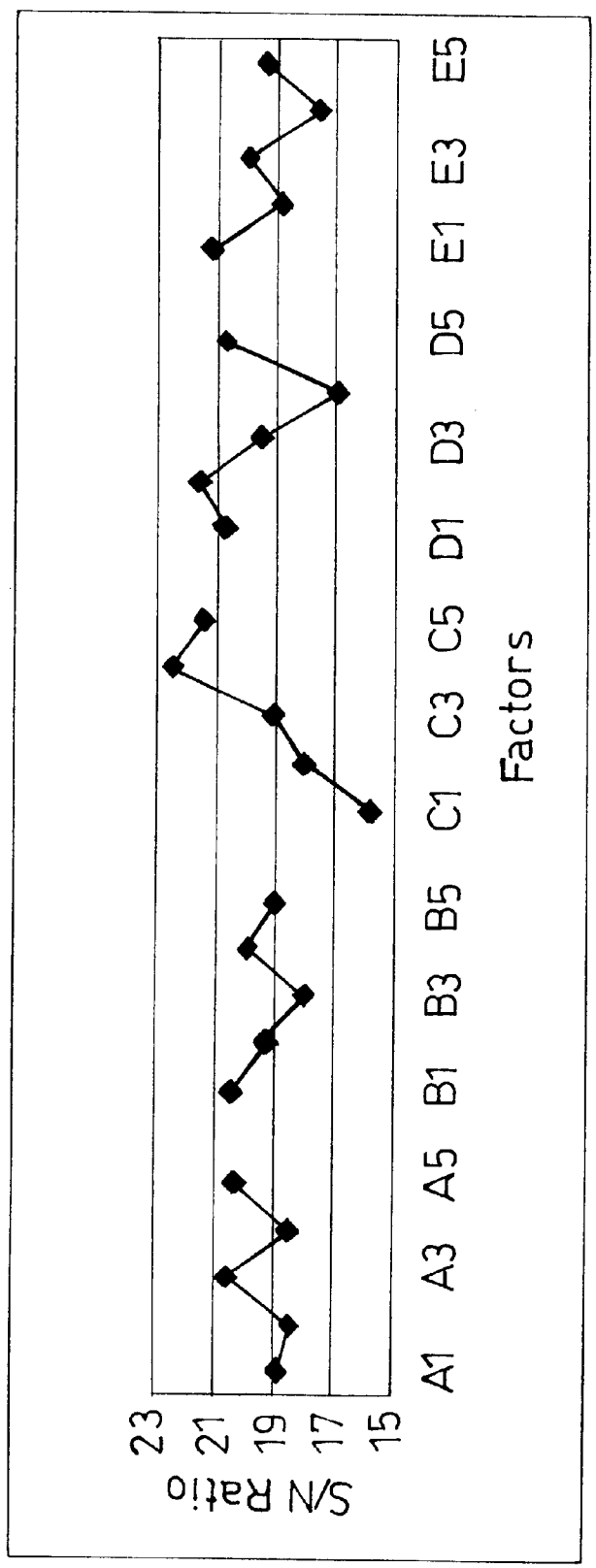
FIG. 2 is a response figure of standard deviation of $t_2$ (STDEV)

According to FIG. 1, $A_5B_5C_1D_5E_1$ is an optimum parameter set of the MRR and according to FIG. 2, $A_3B_1C_4D_2E_1$ is an optimum parameter set of the standard deviation of $t_2$. In FIG. 1, the back pressure (C) and the polishing time (E) are less influential than other parameters in MRR. But the WIWNU (in terms of the standard deviation of $t_2$) is influenced by all five parameters to a certain extent.

Figure 3:
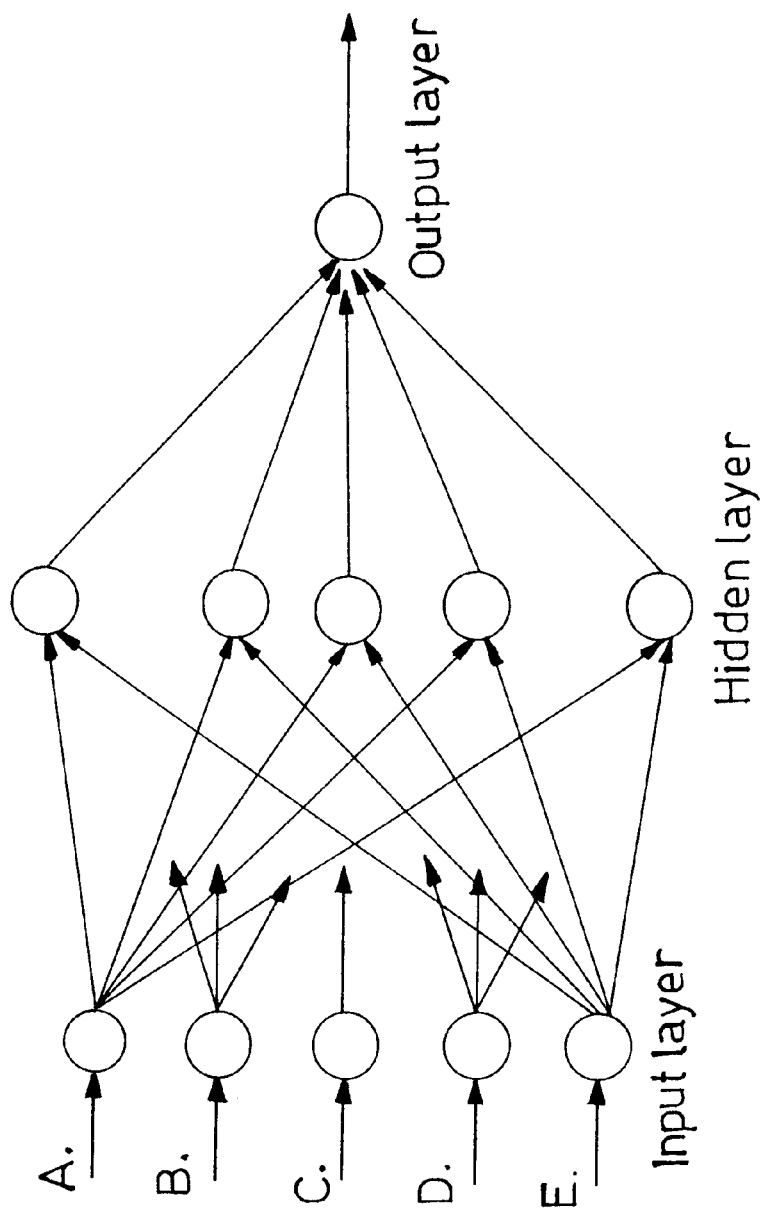
FIG. 3 is an illustration of imitating virtual CMP process in neural network progress in this invention.

3. CMP Process Modeling:

Since CMP is a very complicated system, this invention tries to use highly non-linear neural network to stimulate it. The experimental results in Tab. 2 are used as training sample, and normalize the desired output between +0.8~−0.8 for convenience of the neural network training. The neural network of this invention is shown in FIG. 3, which modifies the parameters and the coefficients automatically.

In the neural network training, the control variables in Tab. 1 are inputs in the training, the MRR and the standard deviation of $t_2$ ($\sigma_{t2}$) are the outputs. However, the MRR and the standard deviation of $t_2$ ($\sigma_{t2}$) are contrary in the request to achieve the optimum efficiency (MRR: the bigger the better; $\sigma_{t2}$: the smaller the better), therefore a hybird performance index is used here:

$$J = a \times MRR(S/N) + b \times \sigma_{t2}(S/N)$$

This performance index includes the MRR and the $\sigma_{t2}$ both, wherein an MRR(S/N) and an $\sigma_{t2}$ (S/N) are optimum in a largest mode in questing the best parameters(S/N), therefore, a magnifying response is popular in this function and is a direction to adjust the parameters in this function. In order to make sure that the CMP works rapidly and the WIWNU remains in desired range, coefficients "a" and "b" are selected to be 0.6 and 0.4, respectively.

4. CMP Processes Parameters Optimization:

Since the values at different levels in orthogonal array are discrete, the optimal parameters set from S/N ratio analysis is still a relatively rough estimation. Additionally, the output of the network as shown in FIG. 3 is the MRR and $\sigma_{t2}$ combined performance index. Therefore, the optimal parameters set can not be obtained from S/N analysis directly. In order to acquire a more precise optimal parameters set, the neural network based implicit CMP model together with the parameters optimization method is adopted to fine-tune the parameters. The fine-tune steps are as follows:

(1) Put the local optimal parameters set from S/N ratio analysis into the neural network and calculate network output value (J)max.

(2) Calculate $$\frac{\partial j}{\partial x_i}$$

around (J)max, change $x_i$ within allowable range to increase $$\frac{\partial j}{\partial x_i}.$$

If $$\frac{\partial j}{\partial x_i}$$

is positive, increase $x_i$; if $$\frac{\partial j}{\partial x_i}$$

is negative, decrease $x_i$. When $x_i$ is not changeable, jump to step (4). ($x_i$ represents the network input)

(3) Use neural network to calculate J, If J>(J)max, set (J)max=J, and go back to step (2).

(4) The parameters set obtained from the above steps are the optimal parameters with regard to MRR and $\sigma_{t2}$ According to above steps, the best parameters set is:

Solid content: 20%;

Down force: 8.0 psi;

Back pressure: 3.2 psi;

Platen speed: 41 rpm; and

Polishing time: 42 sec

Wherein the 42 seconds is a optimal polishing time when other parameters are set as above i.e. the processes can be stopped after 42 seconds to achieve maximal removal rate and acceptable WIWNU.

In order to prove that the optimal parameter set in above-mentioned description really works, testing experiments were carried out at the National Nano Device Lab. (NDL) of Taiwan, R.O.C. The experimental data is shown in Tab. 5, wherein the optimal parameters set is in comparison with an original parameters set currently used at the NDL. Since the carrier speed and oscillation speed have little influence on the MRR and the WIWNU, the primitive settings of those two parameters by NDL are adopted.

TABLE 5 a comparison table of the parameters in best mode and the original mode

|  | Original setting | Optimal setting |
|---|---|---|
| Solid Content | 15% | 20% |
| Down Force | 7 psi | 8 psi |
| Back Pressure | 3 psi | 3.2 psi |
| Platen Speed | 20 rpm | 41 rpm |
| Carrier Speed | 25 rpm | 25 rpm |
| Oscillation Speed | 2 mm/sec | 2 mm/sec |
| Polishing Time | 60 s | 42 s |
| Average of removal amount | 1599.2 A° | 1897.9 A° |
| Average of thickness after polishing | 3509.9 A° | 3149.9 A° |
| WIWNU of thickness after polishing | 112.2 A° | 118.0 A° |
| Experimental MRR | 26.65 A°/s | 45.19 A°/s |
| Experimental WIWNU | 3.1963% | 3.7506% |

When this optimal parameters set is implemented, the polishing processes could be completed in optimal time with the WIWNU staying in acceptable quality. In the experiment for verification, the proposed method offers a better polishing performance while reducing the polishing time by ⅓. The testing experiment proves that the optimal parameters set created from this invention exactly makes the CMP procedure efficient and achieves the end-point detection with no need to remove the wafer from the production line. Therefore, manufacturers do not have to change equipment in hand or add extra instruments but have the precise CMP control. In the view of cost and efficiency, this invention is really practicable and economical to wafer manufacturers.

However, it is to be understood that the disclosure is illustrative only, and changes may be made in detail, especially in different materials which are needed to be removed from a surface of the wafer.

What is claimed is:

1. A method for determining efficient parameters in chemical-mechanical polishing (CMP) processes comprising:

a. using a Taguchi experiment to lead the chemical-mechanical polishing (CMP) procedure and determine essential parameters to calculate a maximum material removal rate (MRR) and the within wafer non-uniformity (WIWNU), wherein four essential coefficients are picked out as changeable parameters and adjusted during the experiments and a polishing time is set to be a fifth parameter to complete a model, experiments are conducted according to a $L_{25}(5\times5)$ orthogonal array of the Taguchi experiment, the $L_{25}(5\times5)$ orthogonal array is built based on five parameters and five levels on each parameter, the material removal rate (MRR) and the within wafer non-uniformity (WIWNU) for each experiment are calculated;

b. analyzing signal-to-noise (S/N) ratios of the material removal rate (MRR) and the within wafer non-uniformity (WIWNU), wherein the S/N ratios of the material removal rate (MRR) and the within wafer non-uniformity (WIWNU) in each trial are calculated and used to make response tables and response figures, and then analysis of variance (ANOVA) is employed in estimating contributing degrees of each parameter to decide a parameter set of the material removal rate (MRR) and the within wafer non-uniformity (WIWNU);

c. establishing the chemical-mechanical polishing (CMP) process with the parameter set of the material removal rate (MRR) and the within wafer nonuniformity (WIWNU), wherein a neural network simulates the chemical-mechanical polishing (CMP) procedure and optimizes the parameter automatically, whereby the data of step (a) are used as training samples of the neural network, wherein the standard deviation of $t_2$ (wafer thickness after polishing) and the material removal rate (MRR) are outputs that define a performance index including the material removal rate (MRR) and the standard deviation of $t_2$, said performance index being optimum in its largest mode; and d. optimizing the parameter set of the chemical-mechanical polishing (CMP) procedure, wherein the neural network based chemical-mechanical polishing (CMP) model in step (c) is adopted in this step and a fine-tuning process is conducted to optimize each parameter of the parameter set, and then an optimum parameter set is obtained.

2. The method for determining efficient parameters in chemical-mechanical polishing as claimed in claim 1, wherein the parameters in step (a) are:

solid content;

down force;

back pressure;

platen speed; and polishing time;

wherein the down force is the pressure (psi, pounds per square inch) to the wafer;

the platen speed is the rotating speed (rpm, revolutions per minute) of a polishing platen;

the solid content is a particle composition (%) of the slurry;

the back pressure is the pressure (psi, pounds per square inch) of a polishing pad; and the polishing time is the deciding time (sec, second) to stop the chemical-mechanical polishing (CMP) process.

3. The method for determining efficient parameters in chemical-mechanical polishing as claimed in claim 1, wherein the fine-tuning process comprises the following steps:

a. put the local optimal parameters set from signal to noise (S/N) ratio into the neural network and calculate network output value (J)max, the neural network has five inputs and one output, the five inputs are parameters specified in claim 2;

b. let $x_i$, denotes the neural network input, calculate $$\frac{\partial J}{\partial x_i}$$

around (J)max, change $x_i$ within an allowable range to increase $$\frac{\partial J}{\partial x_i},$$

if $$\frac{\partial J}{\partial x_i}$$

is positive, increase $x_i$ and if $$\frac{\partial J}{\partial x_i}$$

is negative, decrease $x_i$, when $x_i$ is not changeable, jump to step (d);

c. use the neural network to calculate J, if J>(J)max, set (J)max=J, and go back to step (b);

d. the parameters set obtained from the above steps are the optimal parameters with regard to material removal rate (MRR) and standard deviation of $t_2$.

4. The method for determining efficient parameters in chemical-mechanical polishing as claimed in claim 1, wherein the performance index (J) in step (c) is:

$$J = a \times MRR(S/N) + b \times \sigma t_2(S/N)$$

wherein in this equation:

α and b are coefficients;

$\sigma t_2$ denotes the standard deviation of $t_2$;

MRR(S/N) is the signal to noise ratio of the material removal rate (MRR); and $\sigma t_2$ (S/N) is the signal to noise ratio of $\sigma t_2$.

5. The method for determining efficient parameters in chemical-mechanical polishing as claimed in claim 4, wherein the coefficient α is 0.6 and the coefficient b is 0.4.

6. The method for determining efficient parameters in chemical-mechanical polishing as claimed in claim 1, wherein the optimal parameter set is:

solid content: 20%;

down force: 8.0 pounds per square inch (psi);

back pressure: 3.2 pounds per square inch (psi);

platen speed: 41 revolutions per minute (rpm); and polishing time: 42 seconds (sec).

\* \* \* \* \*